United States Patent
Wang et al.

(10) Patent No.: US 10,163,421 B2
(45) Date of Patent: Dec. 25, 2018

(54) AUTOMATIC PARAMETER ADJUSTMENT SYSTEM AND METHOD FOR DISPLAY DEVICE, AND DISPLAY DEVICE

(71) Applicant: BOE TECHNOLOGY GROUP CO., LTD., Beijing (CN)

(72) Inventors: Xinan Wang, Beijing (CN); Zhenfu Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 69 days.

(21) Appl. No.: 15/101,356

(22) PCT Filed: Oct. 22, 2015

(86) PCT No.: PCT/CN2015/092494
§ 371 (c)(1),
(2) Date: Jun. 2, 2016

(87) PCT Pub. No.: WO2016/192271
PCT Pub. Date: Dec. 8, 2016

(65) Prior Publication Data
US 2017/0116952 A1 Apr. 27, 2017

(30) Foreign Application Priority Data
Jun. 2, 2015 (CN) .......................... 2015 1 0296635

(51) Int. Cl.
*G09G 5/00* (2006.01)
*G06F 3/0484* (2013.01)
(Continued)

(52) U.S. Cl.
CPC ............. *G09G 5/006* (2013.01); *G06F 3/011* (2013.01); *G06F 3/015* (2013.01); *G06F 3/0484* (2013.01);
(Continued)

(58) Field of Classification Search
CPC ...................................................... B60W 50/14
See application file for complete search history.

(56) References Cited

U.S. PATENT DOCUMENTS

2014/0139655 A1 * 5/2014 Mimar ............... G08B 21/0476
348/77
2016/0184703 A1 * 6/2016 Brav ....................... G06F 3/012
463/30
2017/0116952 A1 4/2017 Wang et al.

FOREIGN PATENT DOCUMENTS

CN 102355527 A 2/2012
CN 202150884 U 2/2012
(Continued)

OTHER PUBLICATIONS

First Office Action regarding Chinese Application No. 201510296635.5, dated May 11, 2017. Translation provided by Dragon Intellectual Property Law Firm.
(Continued)

*Primary Examiner* — Thomas Lett
(74) *Attorney, Agent, or Firm* — Harness, Dickey & Pierce, P.L.C.

(57) ABSTRACT

The present disclosure provides an automatic parameter adjustment system and an automatic parameter adjustment method for a display device, and the display device. The automatic parameter adjustment system includes a body state detector configured to detect a body state parameter of a user, and a controller configured to acquire the body state parameter and adjust a parameter of the display device in accordance with the body state parameter.

15 Claims, 3 Drawing Sheets (51) Int. Cl.
*G06F 3/01* (2006.01)
*G06F 3/0346* (2013.01)
*G06F 3/16* (2006.01)

(52) U.S. Cl.
CPC .............. *G09G 5/00* (2013.01); *G06F 3/0346* (2013.01); *G06F 3/165* (2013.01); *G06F 2203/011* (2013.01); *G09G 2320/066* (2013.01); *G09G 2320/0613* (2013.01); *G09G 2320/0626* (2013.01); *G09G 2320/0666* (2013.01); *G09G 2320/08* (2013.01); *G09G 2340/0407* (2013.01); *G09G 2354/00* (2013.01)

(56) References Cited

FOREIGN PATENT DOCUMENTS

| | | |
|---|---|---|
| CN | 104166530 A | 11/2014 |
| CN | 104346074 A | 2/2015 |
| CN | 104866104 A | 8/2015 |
| CN | 204650427 U | 9/2015 |

OTHER PUBLICATIONS

International Search Report and Written Opinion of the International Searching Authority for International Application No. PCT/CN2015/092494, dated Mar. 15, 2016. Translation provided by Dragon Intellectual Property Law Firm.

\* cited by examiner

AUTOMATIC PARAMETER ADJUSTMENT SYSTEM AND METHOD FOR DISPLAY DEVICE, AND DISPLAY DEVICE

CROSS-REFERENCE TO RELATED APPLICATIONS

This application is the U.S. national phase of PCT Application No. PCT/CN2015/092494 filed on Oct. 22, 2015, which claims a priority of the Chinese Patent Application No.201510296635.5 filed on Jun. 2, 2015, the disclosures of which are incorporated in their entirety by reference herein.

TECHNICAL FIELD

The present disclosure relates to the field of display technology, in particular to an automatic parameter adjustment system and method for a display device, and the display device.

BACKGROUND

Along with the development of science and technology, display devices have been widely used in our lives. For example, the display device may be used in a job, and at this time, a user may use the display device to make various electronic files or play videos in a conference.

A body state of the user may be affected by display brightness of the display device. For example, in the case that the user feels sleepy, the display brightness of the display device may be increased so as to raise the spirit of the user. In the related art, a method for adjusting the display brightness of the display device includes manually setting, by the user, a brightness parameter of the display device through a module for adjusting the display brightness. However, it is impossible for the user in a sleepy state to adjust the display brightness manually. Hence, there is an urgent need to provide a system and a method for automatically adjusting the parameter of the display device in accordance with the body state of the user.

SUMMARY

An object of the present disclosure is to provide an automatic parameter adjustment system and method for a display device, and the display device, so as to automatically adjustment a parameter of the display device in accordance with a body state of a user.

In one aspect, the present disclosure provides in some embodiments an automatic parameter adjustment system for a display device, including a body state detector configured to detect a body state parameter of a user, and a controller configured to acquire the body state parameter and adjust a parameter of the display device in accordance with the body state parameter.

According to the automatic parameter adjustment system in the embodiments of the present disclosure, the body state parameter of the user may be acquired, and the parameter of the display device may be adjusted in accordance with the body state. As compared to the related art where the parameter of the display device is manually set by the user, it is able for the system in the embodiments of the present disclosure to automatically adjust the parameter of the display device in accordance with the detected body state parameter.

In another aspect, the present disclosure provides in some embodiments a display device including the above-mentioned controller and an application mode detector.

In yet another aspect, the present disclosure provides in some embodiments an automatic parameter adjustment method for a display device, including steps of acquiring a body state parameter of a user, and adjusting a parameter of the display device in accordance with the body state parameter.

As compared with the related art where the parameter of the display device is manually set by the user in accordance with the body state, it is able for the automatic parameter adjustment method in the present disclosures of the present disclosure to automatically adjust the parameter of the display device in accordance with the detected body state parameter of the user, thereby to enable the parameter of the display device to be adapted to the body state of the user.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
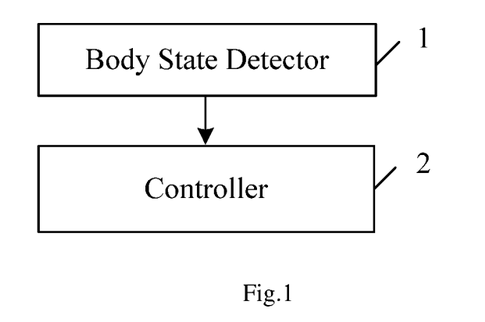
FIG. 1 is a schematic view showing an automatic parameter adjustment system for a display device according to one embodiment of the present disclosure.

The present disclosure provides in some embodiments an automatic parameter adjustment system for a display device. As shown in FIG. 1, the automatic parameter adjustment system includes a body state detector 1 and a controller 2. The body state detector 1 is configured to determine a body state parameter of a user and send the body state parameter to the controller 2. The controller 2 is configured to acquire the body state parameter and adjust a parameter of the display device in accordance with the body state parameter.

It should be appreciated that, the parameter of the display device may include a display parameter and an audio parameter. For example, the display parameter may include at least one of the parameters selected from the group consisting of display brightness, color temperature, tone, contrast and resolution, and the audio parameter may include at least one of the parameters selected from the group consisting of volume, timbre and pitch. The body state parameter may include at least one of the parameters selected from the group consisting of cortisol level, heart rate, blood pressure, breath, electrodermal activity, palm sweat, pupil diameter, even-related potential (ERP), brain wave, movement range, and movement speed. The body state of the user may include a slightly sleepy state, a sleepy state, a mild state, a slightly excited state and an excited state. These body states are merely used to differentiate the physiological parameters and the movement parameters.

It should be further appreciated that, the body state detector 1 is configured to determine the body state parameter of the user and send it to the controller, and the controller 2 is configured to adjust the parameter of the display device in accordance with the body state parameter. In the embodiments of the present disclosure, the body state detector 1 may send the body state parameter to the controller 2 in a wired or wireless manner, i.e., a communication mode between the body state detector 1 and the controller 2 is not particularly defined herein.

According to the automatic parameter adjustment system in the embodiments of the present disclosure, the body state parameter of the user may be detected, and the parameter of the display device may be adjusted in accordance with the body state parameter. As a result, it is able for the system to automatically, rather than manually, adjust the parameter of the display device in accordance with the body state parameter, thereby to enable the parameter of the display device to be adapted to the body state of the user.

The automatic parameter adjustment system at least includes the following two implementation modes.

Figure 2:
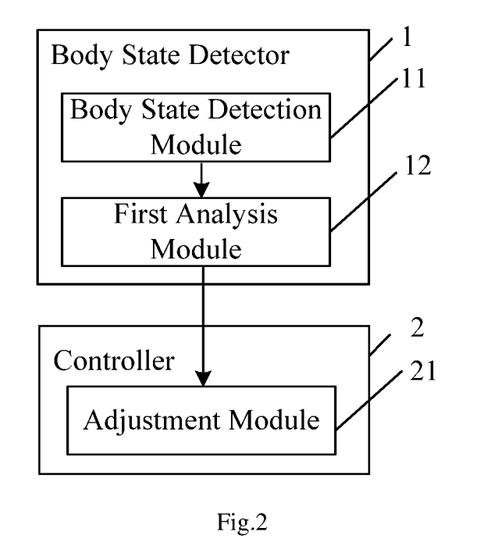
FIG. 2 is another schematic view showing the automatic parameter adjustment system according to one embodiment of the present disclosure.

In a first implementation mode, as shown in FIG. 2, the body state detector 1 may include a body state detection module 11 and a first analysis module 12 connected to the body state detection module 11, and the controller 2 includes an adjustment module 21. The body state detection module 11 is configured to detect the body state parameter of the user. The first analysis module 12 is configured to acquire the body state parameter detected by the body state detection module 11, and determine body state information about the user in accordance with the body state parameter. The adjustment module 21 is configured to acquire the body state information, and adjust the parameter of the display device in accordance with the body state information.

The body state information may include information about the sleepy state, the slightly sleepy state, the mild state, the slightly excited state or the excited state. For example, in the case that the heart rate of the user is smaller than a first heart rate threshold and a heartbeat value of the user is smaller than a first heartbeat threshold, the body state information is the information about the sleepy state. In the case that the heart rate is greater than the first heart rate threshold and smaller than a second heart rate threshold and the heartbeat value is greater than the first heartbeat threshold and lower than a second heartbeat threshold, the body state information is the information about the slightly sleepy state. The information about the mild state, the slightly excited state and excited state may be determined in a similar manner. It should be appreciated that, the body state information may correspond to several body state parameters, i.e., the body state information may be determined in accordance with several body state parameters. It should be further appreciated that, these names are merely used to differentiate different body states corresponding to different body state parameters. In addition, the names of the body states are not limited thereto, and any other body states may also be set in accordance with the body state parameters.

For example, the body state detection module 11 may detect the heart rate, the blood pressure and the movement range of the user, and send the body state parameters to the first analysis module 12. Next, the first analysis module 12 may determine that two values of the body state parameters are decreased in the case that the heart rate is smaller than the first heart rate threshold, the blood pressure is smaller than a first blood pressure threshold and the movement range is greater than a first range threshold. In order to determine the body state of the user accurately, the first analysis module 12 may determine the body state in accordance with the heart rate and the blood pressure, i.e., it may determine that the body state of the user is the sleepy state. Then, the adjustment module 21 may acquire the body state information, and upward-adjust the display brightness and the tone of the display device in accordance with the body state information.

In the embodiments of the present disclosure, the body state detection module 11 may also detect one of the body state parameters. However, abnormalities may occur during the detection, and the body state of the user may be misjudged. However, in the case that various body state parameters of the user are detected by the body state detection module 11, it is able to determine the body state of the user in a more accurate manner.

Figure 3:
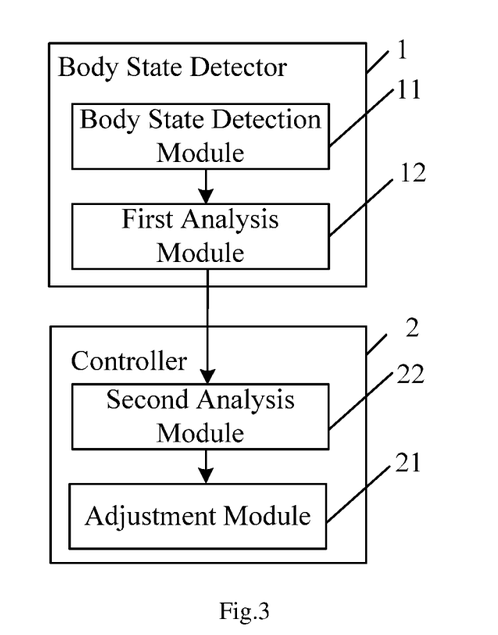
FIG. 3 is yet another schematic view showing the automatic parameter adjustment system according to one embodiment of the present disclosure.

In some embodiments of the present disclosure, the display device may be commonly used by a plurality of users. At this time, as shown in FIG. 3, the automatic parameter adjustment system may include a plurality of body state detectors 1 corresponding to the users respectively, and the controller 2 may further include a second analysis module 22 connected to the adjustment module 21. The second analysis module 22 is configured to acquire several pieces of the body state information, and determine, in accordance with predetermined priority levels of the body state detectors 1, the body state information corresponding to the body state detectors with the highest priority level as the body state information corresponding to the users. For ease of description, the body state information corresponding to the users is integrally taken as overall body state information.

The adjustment module 21 is further configured to acquire the overall body state information and adjust the parameter of the display device in accordance with the overall body state information.

For example, in the case that the display device is commonly used by three users, the automatic parameter adjustment system includes first, second and third body state detectors 1 corresponding to the three users respectively. The first body state detector has the highest priority level, so the second analysis module 22 may take the body state information detected by the first body state detector as the overall body state information corresponding to the three users. Then, the adjustment module 21 may adjust the parameter of the display device in accordance with the body state information. In addition, in the case that the body state information detected by the first body state detector is the information about the excited state, the body state information detected by the second body state detector is the information about the mild state and the body state information detected by the third body state detector is the information about the excited state, the second analysis module 22 may determine the information about the body states that occur frequently as the overall body state information, i.e., determine the body state as the excited state, or it may determine the body state as the slightly excited state in accordance with an average of the body states. Then, the adjustment module 21 may adjust the parameter of the display device in accordance with the overall body state information. The requirements of several users may be met by determining the overall body state information in accordance with several pieces of body state information, so in some embodiments of the present disclosure, the second analysis module 22 may be configured to determine the overall body state information about the users in accordance with several pieces of body state information.

Figure 4:
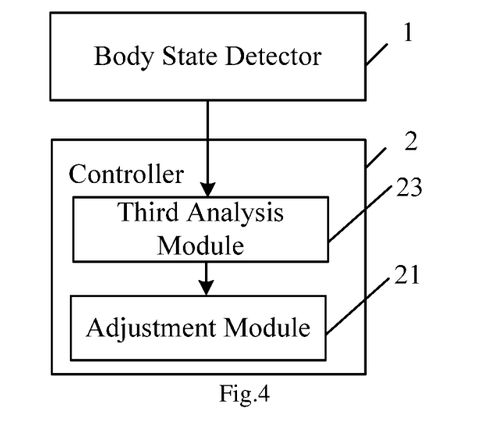
FIG. 4 is still yet another schematic view showing the automatic parameter adjustment system according to one embodiment of the present disclosure.

In another implementation mode, as shown in FIG. 4, the controller 2 may include a third analysis module 23 and the adjustment module 21. The third analysis module 23 is configured to acquire the body state parameter and determine the body state information about the user in accordance with the body state parameter. The adjustment module 21 is configured to acquire the body state information and adjust the parameter of the display device in accordance with the body state information. The function of the third analysis module 23 may refer to that of the first analysis module 12, and thus will not be particularly defined herein.

In some embodiments of the present disclosure, the display device may be commonly used by several users. At this time, as shown in FIG. 4, the automatic parameter adjustment system may include several body state detectors 1 corresponding to the users respectively. The third analysis module 23 may be further configured to determine, in accordance with predetermined priority levels of the body state detectors 1, the body state information corresponding to the body state detector 1 with the highest priority level as the overall body state information about the users. The adjustment module 21 may be further configured to acquire the overall body state information, and adjust the parameter of the display device in accordance with the overall body state information. The function of the third analysis module 23 may refer to that of the second analysis module 22, and thus will not be particularly defined herein.

In the embodiments of the present disclosure, the adjustment module 21 may include a first adjustment unit and/or a second adjustment unit. The first adjustment unit is configured to acquire the overall body state information about the users, and directly adjust the parameter of the display device in accordance with the overall body state information. For example, in the case that the overall body state information is the information about the excited state, the first adjustment unit may directly downward-adjust the display brightness, the color temperature and the tone of the display device. The second adjustment unit is configured to acquire the overall body state information about the users, and select a display mode of the display device in accordance with the overall body state information. The display modes correspond to different parameters of the display device.

In the embodiments of the present disclosure, the display modes include a low-brightness mode, a low-color-temperature mode, a high-color-temperature mode and a high-brightness mode. For example, in the low-brightness mode, the display brightness is smaller than a first brightness threshold, the volume is smaller than a first volume threshold, and the color temperature and the tone are not particularly defined. In the low-color-temperature mode, the color temperature is smaller than a first color temperature threshold, the display brightness is smaller than the first brightness threshold, the tone is smaller than a first tone threshold, and the volume is not particularly defined. In the high-color-temperature mode, the color temperature is greater than the first color temperature threshold, the display brightness is greater than the first brightness threshold, the tone is greater than the first tone threshold, and the volume is not particularly defined. In the high-brightness mode, the display brightness is greater than the first brightness threshold, the volume is greater than the first volume threshold, and the color temperature and the tone are not particularly defined. It should be appreciated that, the display modes of the display device may be set in accordance with any other display parameters and audio parameters. In addition, the display modes of the display device are not limited thereto, and any other display modes may be set in accordance with the parameters of the display device. It should be further appreciated that, these display modes are merely used to differentiate the parameters of the display device.

Because the first adjustment unit may gradually adjust the parameter of the display device in accordance with the overall body state information, the parameter of the display device may be adjusted in a more accurate manner by the first adjustment unit as compared with the second adjustment unit. In some embodiments of the present disclosure, alternatively, the parameter of the display device is adjusted by the first adjustment unit.

Figure 5:
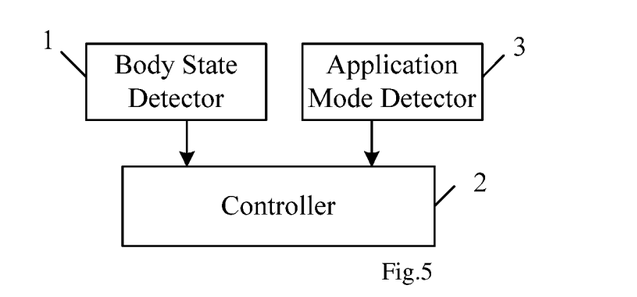
FIG. 5 is still yet another schematic view showing the automatic parameter adjustment system according to one embodiment of the present disclosure.

In the embodiments of the present disclosure, as shown in FIG. 5, the automatic parameter adjustment system may further include an application mode detector 3 configured to detect an application mode of the display device, so as to adjust the parameter of the display device in various application scenarios. The controller 2 is further configured to acquire the body state parameter detected by the body state detector 1 and the application mode detected by the application mode detector 3, and adjust the parameter of the display device in accordance with the body state parameter and the application mode.

It should be appreciated that, the structures and the functions of the body state detector 1 and the controller 2 may refer to those mentioned hereinabove. It should be further appreciated that, the application mode of the display device may include a working operation, an entertainment mode, a monitoring mode or a hospital mode, and these application modes are set in accordance with application environments of the display device. For example, in the case that the display device is used by the user over work, the application mode thereof is the working mode; in the case that the display device is used in entertainment, e.g., watching a movie, the application mode thereof is the entertainment mode; in the case that the display device is used by the user for monitoring, e.g., monitoring a traffic condition, the application mode thereof is the monitoring mode; and in the case that the display device is used by the user in hospital, the application mode thereof is the hospital mode.

For example, after the application mode of the display device is determined by the application mode detector 3 as the working mode and the body state detector 1 acquires the body state parameter of the user, the controller 2 may downward-adjust the display brightness, the color temperature and the tone of the display device in accordance with the working mode and the body state parameter, e.g., a parameter corresponding to the excited state, so as to change the body state of the user, thereby to improve the work efficiency. After the application mode detector 3 determines the application mode of the display device as the entertainment mode and the body state detector 1 acquires the body state parameter of the user, the controller 2 may upward-adjust the display brightness and the volume of the display device in accordance with the entertainment mode and the body state parameter, e.g., a parameter corresponding to the slightly sleepy state, so as to raise the user's spirit. In the case that the application mode detector 3 determines the application mode of the display device as the monitoring mode and the body state detector 1 determines the body state parameter of the user, the controller 2 may upward-adjust the display brightness, the color temperature and the tone of the display device in accordance with the monitoring mode and the body state parameter, e.g., a parameter corresponding to the slightly sleepy state, so as to improve the monitoring accuracy. In the case that the application mode detector 3 determines the application mode of the display device as the hospital mode and the body state detector 1 determines the body state parameter of the user, the controller 2 may downward-adjust the display brightness, the color temperature and the tone of the display device in accordance with the monitoring mode and the body state parameter, e.g., a parameter corresponding to the slightly excited state, so as to increase a recovery rate of the user. It should be appreciated that, in the case that the application mode detector 3 determines the application mode of the display device as the hospital mode, the controller 2 may always downward-adjust the parameters of the display device, such as the display brightness, the tone and the volume. In addition, an additional display mode may be provided, so as to gradually downward-adjust the parameters such as the display brightness, the tone and the volume, so as to increase the recovery rate.

The automatic parameter adjustment system may adjust the parameter of the display device in accordance with the application scenarios, so as to meet the various requirements of the users.

In the embodiments of the present disclosure, the application mode detector 3 may include a first detection module and/or a second detection module. The first detection module is configured to detect an application mode command inputted by the user, so as to directly determine the application mode. The second detection module is configured to detect an application scenario of the display device, and determine the application mode of the display device in accordance with the application scenario. For example, the second detection module may be a camera for capturing an image of the application scenario and determining the application mode in accordance with the image. The application scenarios of the display device may be similar to each other, so in some embodiments of the present disclosure, alternatively the application mode of the display device may be determined by the first detection module. At this time, it is able to determine the application mode of the display device in a more accurate manner, thereby to accurately adjust the parameter of the display device.

In the embodiments of the present disclosure, the body state detector 1 may be built in a wearable device, and the controller 2 may be built in the display device. The wearable device may be a device in direct contact with the user's skin, e.g., it may be a watch, a bracelet, a necklet, a ring or a hat. The wearable device may be a device capable of detecting a movement range of the user, e.g., a schoolbag or a shoe. Further, the wearable device may be a device in direct contact with the user's skin and capable of detecting the movement range of the user, e.g., a ring or bracelet.

In addition, the body state detector may also be built in the display device. For example, it may be an infrared temperature detector for detecting a body temperature of the user. The application mode detector may be built in the wearable device or the display device.

The present disclosure further provides in some embodiments a display device including the controller and the application mode detector, or including the controller, the body state detector and the application mode detector. The display device may be any product or member having a display function, such as an electronic paper, a mobile phone, a flat-panel computer, a television, a display, a laptop computer or a navigator.

Figure 6:
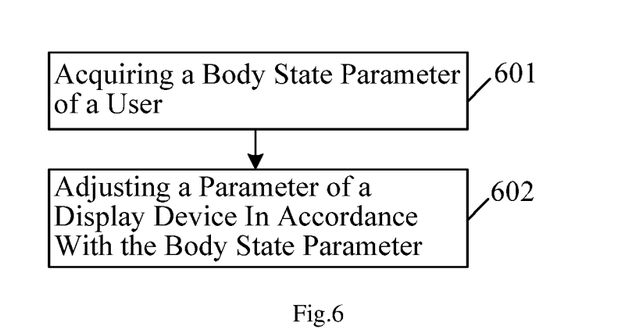
FIG. 6 is a flow chart of an automatic parameter adjustment method for a display device according to one embodiment of the present disclosure.

The present disclosure further provides in some embodiments an automatic parameter adjustment method for a display device. As shown in FIG. 6, the automatic parameter adjustment method includes the following steps.

Step 601: acquiring the body state parameter of the user. For example, the body temperature of the user may be detected by a temperature detection module, or the heart rate of the user may be detected by a heart rate detection module.

Step 602: adjusting the parameter of the display device in accordance with the body state parameter. For example, the display brightness, the color temperature or the volume of the display device may be adjusted in accordance with the body temperature and the heart rate.

According to the automatic parameter adjustment method in the embodiments of the present disclosure, the body state parameter of the user may be detected, and the parameter of the display device may be adjusted in accordance with the body state parameter. As a result, it is able to automatically adjust the parameter of the display device as compared with the related art where the parameter of the display device is adjusted manually.

In the embodiments of the present disclosure, subsequent to Step 601 and prior to Step 602, the method further includes determining the body state information about the user in accordance with the body state parameter. At this time, Step 602 further includes adjusting the parameter of the display device in accordance with the body state information.

In the embodiments of the present disclosure, the display device may be commonly used by several users, and at this time, after the step of determining the body state information and prior to Step 602, the automatic parameter adjustment method further includes determining, in accordance with the predetermined priority levels, the body state information with the highest priority level as the overall body state information about the users. Step 602 further includes adjusting the parameter of the display device in accordance with the overall body state information.

In the embodiments of the present disclosure, the step of adjusting the parameter of the display device in accordance with the overall body state information includes directly adjusting the parameter of the display device or selecting a display mode of the display device in accordance with the overall body state information. The display modes correspond to different parameters of the display device.

In the embodiments of the present disclosure, prior to Step 602, the automatic parameter adjustment method further includes detecting the application mode of the display device. Step 602 further includes adjusting the parameter of the display device in accordance with the body state parameter and the application mode.

In the embodiments of the present disclosure, the step of detecting the application mode of the display device includes detecting an application mode command inputted by the user and directly determining the application mode, or detecting an application scenario of the display device and determining the application mode of the display device in accordance with the application scenario.

The above embodiments are described in a progressive manner, and the identical or similar contents in the embodiments are not repeated, i.e., each embodiment focuses on the difference from the others. Especially, the relevant contents in the embodiments involving the method may refer to those in the embodiments involving the product.

It should be appreciated that, the above-mentioned embodiments involving the system are merely for illustrative purpose, and the components of the system may be, or may not be, physically separated from each other. The components for displaying may be, or may not be, physical entities, i.e., they may be arranged at an identical position, or distributed on a plurality of units. A person skilled in the art may, without any creative effort, select parts or all of the modules in accordance with the practical need, so as to achieve the purpose of the present disclosure.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. An automatic parameter adjustment system for a display device, comprising:
    a body state detector configured to detect a body state parameter of a user; and
    a controller configured to acquire the body state parameter and adjust a parameter of the display device in accordance with the body state parameter, wherein
    the body state detector comprises a body state detection module configured to detect the body state parameter, and a first analysis module configured to determine body state information about the user in accordance with the body state parameter,
    the controller comprises an adjustment module configured to adjust the parameter of the display device in accordance with the body state information,
    the automatic parameter adjustment system comprises a plurality of body state detectors corresponding to a plurality of users,
    the controller further comprises a second analysis module connected to the adjustment module, the second analysis module configured to acquire body state information about the plurality of users, and determine, in accordance with predetermined priority levels of the body state detectors, body state information corresponding to the body state detector with the highest priority level as overall body state information corresponding to the plurality of users, and
    the adjustment module is further configured to adjust the parameter of the display device in accordance with the overall body state information corresponding to the plurality of users.

2. The automatic parameter adjustment system according to claim 1, wherein
    the controller further comprises a third analysis module and an adjustment module,
    the third analysis module is configured to determine the body state information about the user in accordance with the body state parameter, and
    the adjustment module is configured to adjust the parameter of the display device in accordance with the body state information.

3. The automatic parameter adjustment system according to claim 2, wherein
    the automatic parameter adjustment system comprises a plurality of body state detectors corresponding to a plurality of users,
    the third analysis module is further configured to determine, in accordance with predetermined priority levels of the body state detectors, body state information corresponding to the body state detector with the highest priority level as overall body state information corresponding to the plurality of users, and
    the adjustment module is further configured to adjust the parameter of the display device in accordance with the overall body state information corresponding to the plurality of users.

4. The automatic parameter adjustment system according to claim 1, wherein
    the adjustment module comprises a first adjustment unit and/or a second adjustment unit,
    the first adjustment unit is configured to adjust the parameter of the display device in accordance with the overall body state information corresponding to the plurality of users, and
    the second adjustment unit is configured to, in accordance with the overall body state information corresponding to the plurality of users, select a display mode from a plurality of display modes of the display device as the adjusted parameter of the display device.

5. The automatic parameter adjustment system according to claim 4, wherein the plurality of display modes includes a low-brightness mode, a low-color-temperature mode, a high-color-temperature mode and a high-brightness mode.

6. The automatic parameter adjustment system according to claim 1, further comprising an application mode detector, wherein
    the application mode detector is configured to detect an application mode of the display device, and
    the controller is further configured to adjust the parameter of the display device in accordance with the body state parameter and the application mode.

7. The automatic parameter adjustment system according to claim 6, wherein
    the application mode detector includes a first detection module and/or a second detection module,
    the first detection module is configured to detect an application mode command inputted by the user and determine the application mode in accordance with the application mode command, and
    the second detection module is configured to detect an application scenario where the display device is located, and determine the application mod of the display device in accordance with the application scenario.

8. The automatic parameter adjustment system according to claim 6, wherein the application mode includes a working operation, an entertainment mode, a monitoring mode or a hospital mode.

9. The automatic parameter adjustment system according to claim 6, wherein
    the body state detector is built in the display device, and the application mode detector is built in a wearable device or the display device.

10. The automatic parameter adjustment system according to claim 1, wherein the body state parameter comprises at least one selected from the group consisting of cortisol level, heart rate, blood pressure, breath, electrodermal activity, palm sweat, pupil diameter, even-related potential (ERP), and brain wave, and the parameter of the display device comprises a display parameter and/or an audio parameter, the display parameter of the display device comprises at least one selected from the group consisting of display brightness, color temperature, tone and contrast.

11. The automatic parameter adjustment system according to claim 1, wherein the body state detector is built in a wearable device, the controller is built in the display device, and the wearable device is a device in contact with the user, and/or a device capable of detecting a movement range of the user.

12. An automatic parameter adjustment method for a display device, comprising:

acquiring a body state parameter of a user; and adjusting a parameter of the display device in accordance with the body state parameter, wherein subsequent to the acquiring of the body state parameter of the user and prior to the adjusting of the parameter of the display device, the automatic parameter adjustment method further comprises determining body state information about the user in accordance with the body state parameter, wherein the adjusting of the parameter of the display device in accordance with the body state parameter further comprises adjusting the parameter of the display device in accordance with the body state information, and subsequent to the determining of the body state information about the user and prior to the adjusting of the parameter of the display device, the automatic parameter adjustment method further comprises determining, in accordance with predetermined priority levels, body state information with the highest priority level from body state information about a plurality of users as overall body state information corresponding to the plurality of users, wherein the adjusting of the parameter of the display device in accordance with the body state information further comprises adjusting the parameter of the display device in accordance with the overall body state information corresponding to the plurality of users.

13. The automatic parameter adjustment method according to claim 12, wherein the adjusting of the parameter of the display device in accordance with the overall body state information corresponding to the plurality of users comprises:

adjusting the parameter of the display device in accordance with the overall body state information corresponding to the plurality of users; or selecting, in accordance with the overall body state information corresponding to the plurality of users, a display mode from a plurality of display modes of the display device as the adjusted parameter of the display device.

14. The automatic parameter adjustment method according to claim 12, wherein prior to the adjusting of the parameter of the display device, the automatic parameter adjustment method further comprises detecting an application mode of the display device, and the adjusting of the parameter of the display device in accordance with the body state parameter further comprises adjusting the parameter of the display device in accordance with the body state parameter and the application mode.

15. The automatic parameter adjustment method according to claim 14, wherein the detecting of the application mode of the display device comprises:

detecting an application mode command inputted by the user and determining the application mode in accordance with the application mode command; or detecting an application scenario where the display device is located, and determining the application mode of the display device in accordance with the application scenario.

* * * * *